United States Patent Office 3,291,815
Patented Dec. 13, 1966

3,291,815
6-FLUORO-16α-METHYL CORTICOSTEROIDS
Ellis Rex Pinson, Jr., Jackson Heights, N.Y., assignor to Chas. Pfizer & Co., Inc., Brooklyn, N.Y., a corporation of Delaware
No Drawing. Filed Aug. 26, 1959, Ser. No. 836,076
1 Claim. (Cl. 260—397.45)

This application is a continuation-in-part of my earlier filed copending U.S. application Serial Number 778,332, filed December 5, 1958, now abandoned.

The present invention is concerned with new and useful steroid compounds and to a procedure for producing them. More particularly, it is concerned with certain 16α-methyl pregnane derivatives and 21-esters thereof, to novel intermediates in the production thereof, and a process for the production of the novel compounds and the novel intermediates.

Although 16α-methyl pregnane derivatives are known, the 6α-fluoro and 6β-fluoro-16α-methyl derivatives have not yet been reported.

Compounds of the character described in the present application possess valuable anti-inflammatory, anti-rheumatoid arthritic and glucocorticoid activities to a remarkable degree. The 6-fluoro-16α-methylated corticosteroids of this invention have been found to possess these valuable therapeutic activities to a much higher degree than the heretofore available 16α-methylated corticosteroids and 16α-methylated-9α-fluoro-corticosteroids.

These compounds are also useful in the treatment of inflammatory conditions of the skin, ears and eyes of humans and of valuable domestic animals as well as contact dermatitis and other allergic reactions. Compositions containing the valuable compounds of the present invention can be prepared for administration to humans or animals in conventional dosage forms such as pills, tablets, capsules, solutions, elixirs or syrups for oral use, or in liquid forms which are adaptable to the natural and synthetic cortical steroid hormones for injectable products. The novel steroids can also be administered topically in the form of ointments, creams, and the like.

The novel end products of this invention include those represented by the formula

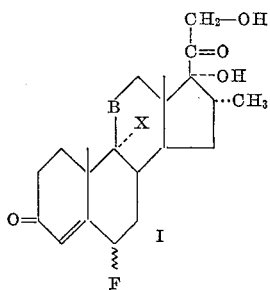

wherein B is selected from the group consisting of the carbonyl, α-hydroxymethylene and β-hydroxymethylene radicals; X is selected from the group consisting of hydrogen, methoxyl, ethoxyl, halogen, especially fluorine; and the 21-acylates thereof wherein the acyl radical is that of a hydrocarbon carboxylic acid containing from 1 to 8 carbon atoms, inclusive. The configuration of the 6-fluoro atom may be α or β. Included also within the scope of this invention are the $\Delta^{1,4}$-analogs corresponding to the above generic formula.

The process of the present invention for producing 6α-fluoro-16α-methyl steroids is illustrated by the following outline utilizing a $\Delta^4$-pregnene derivative as starting material. It should be understood that although the outline refers to 16α-methylcortisone-21 acetate, the reactions are similarly applicable to other compounds represented by the above generic formula in which, of course, the 6-fluoro group is absent. The term Ac represents an acyl radical of a hydrocarbon carboxylic acid containing from 1 to 8 carbon atoms, inclusive.

For the production of the 6β-fluoro-16α-methyl steroids of the present invention, the same series of reactions are utilized except that the isomerization step is eliminated.

The invention includes also modifications of the process which comprises using as starting material a compound obtainable as an intermediate product at any stage of the process and carrying out the remaining process steps.

The process of the present invention for preparing 6α-fluoro-16α-methyl derivatives may be practiced in general by subjecting the appropriate 16α-methyl substituted corticosteroids, for example, 16α-methyl-$\Delta^4$-pregnene-17α,21-diol-3,11,20-trione-21 acetate (I) to hydrolysis to obtain the corresponding 21-alcohol, followed by treatment with aqueous formaldehyde in the presence of a hydrogen halide to produce the BMD derivative of 16α-methyl-$\Delta^4$-pregnene-17α,21-diol-3,11,20-trione (II). Treatment of the thus produced BMD derivative with an alkylene glycol produces the 3-ketal of the $\Delta^5$-steroid compound (III), which is then reduced with sodium borohydride to give the BMD derivative of 16α-methyl-$\Delta^5$-pregnene-11β,17α,21-triol-3,20-dione-3-alkylene ketal (IV). Treatment of the thus produced 11β-hydroxy-$\Delta^5$-pregnene with hydrogen peroxide or an organic peracid produces the corresponding highly useful 5α,6α-epoxide intermediate (V). Dehydration of the thus obtained 5α,6α-oxido derivative at the 9,11 positions yields the BMD derivative of 5α,6α-oxido-16α-methyl-$\Delta^{9(11)}$-pregnene-17α,21-diol-3,20-dione-3-alkylene glycol (VI) which on treatment with a fluorinating agent produces the corresponding 5α-hydroxy 6β-fluoro halohydrin compound (VII). Removal of the protective BMD and ketal functions of the thus produced fluorohydrin is accomplished by treatment with acid to give 6β-fluoro-16α-methyl-$\Delta^{9(11)}$-pregnene 5α,17α,21-triol-3,20-dione (VIII), which upon acetylation and dehydration yields 6β-fluoro-16α-methyl - $\Delta^{4,9(11)}$ - pregnadiene - 17α,21-diol-3,20-dione-21 acetate (IX). Isomerization of the 6β-fluoro derivative thus produced with a prototropic agent yields the 6α-fluoro-16α-methyl-$\Delta^{4,9(11)}$-pregnadiene-17α,21 - diol-3,20-dione-21 acetate (X). Treatment of the said 6α-fluoro compound with a hypohalogenating agent yields the 6α-fluoro-9α-halo-16α-methyl-$\Delta^4$-pregnene - 11β,17α,21-triol-3,20-dione-21 acetate (XI). Alternatively, the 6β-fluoro-16α-methyl-$\Delta^{4,9(11)}$-pregnadiene-17α,21-diol - 3,20-dione (IX) can be treated with a hypohalogenating agent to produce the 6β-fluoro-9α-halo-16α-methyl-$\Delta^4$-pregnene-11β,17α,21-triol-3,20-dione-21 acylate (XI). Isomerization of the said halohydrin-21 acylate produces the 6α-fluoro-9α-halo-16α-methyl-$\Delta^4$-pregnene - 11β,17α,21-triol-3,20-dione-21 acylate (XI).

The said halohydrin derivative is then treated with an alkali acetate to produce the 9β,11β-oxido derivative (XII) which is then treated with a fluorinating agent to give the 9α-fluoro-11β-hydroxy compound (XIII), and thereafter hydrolyzed to the 6α,9α-difluoro-16α-methyl-$\Delta^4$-pregnene-11β,17α,21-triol-3,20 - dione. Oxidation of the 21-acylate of the said halohydrins (XI and XIII) yields the 6α-fluoro-9α-halo-16α-methyl-$\Delta^4$-pregnene-17α, 21-diol-3,11,20-triol-21 acetate (XIV) which is then hydrolyzed in acid media to the corresponding 21-alcohol. The halohydrin 21-acylates (XI and XIII) can be dehydrogenated to give the corresponding 6α-fluoro-9α-halo-16α-methyl-$\Delta^{1,4}$-pregnadiene - 11β,17α,21-triol-3,20-dione-21 acylate (XV) and thereafter oxidized and hydrolyzed to give the corresponding 6α-fluoro-9α-halo-16α-methyl- $\Delta^{1,4}$-pregnadiene-17$\alpha$,21-diol-3,11,20 - trione (XVI). Alternatively, the 6$\alpha$-fluoro-9$\alpha$-halo-16$\alpha$-methyl-$\Delta^4$-pregnene-17$\alpha$,21-diol-3,11,20-trione-21 acylate (XIV) can likewise be dehydrogenated to the corresponding $\Delta^{1,4}$-pregnadiene derivative (XVI).

The process of the present invention for producing 6$\alpha$-(or $\beta$)-fluoro-16$\alpha$-methyl corticosteroids having hydrogen in the 9-position and an oxygen containing group in the 11-position involves fluorination of compound V to give the valuable intermediate 17,20,20,21-bismethylenedioxy - 3 - keto - 5$\alpha$,11$\beta$ - dihydroxy - 6$\beta$ - fluoro - 16$\alpha$-methyl-allopregnane 3-ethylene ketal, the compound analogous to compound VII wherein hydrogen and hydroxyl occupy the 9- and 11-positions, respectively. Application of reaction steps 8 through 11 of the reaction sequence produces XVII, 6$\alpha$-fluoro-16$\alpha$-methyl-hydrocortisone 21-acetate. Oxidation of the thus produced hydrocortisone 21-acetate derivative (XVII) gives the corresponding 6$\alpha$-fluoro-16$\alpha$-methyl-cortisone 21-acetate (XVIII). Dehydrogenation of XVII and XVIII then produces the corresponding 6$\alpha$-fluoro-16$\alpha$-methyl-prednisolone and 6$\alpha$-fluoro-16$\alpha$-methyl prednisone 21-acetates, respectively which are hydrolyzed to the 21-alcohols:

Alternatively, compound V can be oxidized to the corresponding valuable intermediate 11-keto compound which is then subjected to reaction steps 7 through 11 as outlined above for the corresponding 11$\beta$-hydroxy compound to give 6$\alpha$-fluoro-16$\alpha$-methyl-cortisone 21-acetate (XVIII). Reduction of the thus produced cortisone derivative produces the corresponding hydrocortisone derivative (XVII).

The process of the present invention for producing 6$\beta$-fluoro-16$\alpha$-methyl corticosteroids involves, as mentioned above, essentially the same reaction sequence with, of course, elimination of the isomerization step of the compound (IX).

It is an object of the present invention to provide novel 16$\alpha$-methylated corticosteroids and the 21-acylates thereof. A further object of this invention is to provide novel 6-fluoro-16$\alpha$-methylated corticosteroids and the 21-acylates thereof. Still a further object of this invention is to provide novel intermediates of the 6-fluoro-16$\alpha$-methylated corticosteroids of the instant invention. Another object of the present invention is the provision of a process for the production of these novel 6-fluoro-16$\alpha$-methylated corticosteroids and the intermediates thereof. Other objects will be apparent to those skilled in the art to which this invention pertains.

The 16$\alpha$-methyl-$\Delta^4$-pregnene-17$\alpha$,21-diol-3,11,20-trione-21 acylate utilized in the first step of the above illustration of the valuable compounds of this invention, is prepared according to the procedure of Arth, et al., set forth in the J. Am. Chem. Soc., 80, page 3160, or according to the method described by Oliveto, et al., in the J. Am. Chem. Soc., 80, 4428. Other 16$\alpha$-methylated steroids, such as, 16$\alpha$-methylhydrocortisone, 16$\alpha$-methyl-9$\alpha$-fluorohydrocortisone, and 16$\alpha$ - methyl-9$\alpha$-chlorohydrocortisone, which also may serve as starting materials for this reaction sequence are prepared according to the method of Arth, et al., described in the J. Am. Chem. Soc., 80, 3161.

In preparing the 6-fluoro-9$\alpha$-alkoxy-16$\alpha$-methyl derivatives of the instant invention, the 9$\alpha$-alkoxy substituent can be introduced into the steroid nucleus by a modification of the above reaction sequence which comprises the acid catalyzed opening of the 9$\beta$,11$\beta$-oxide compound (XII) in the presence of a lower alcohol to give the 6-fluoro-9$\alpha$-alkoxy-16$\beta$-methyl corticosteroid. 9$\alpha$-alkoxy-16$\alpha$-methyl derivatives which may serve as starting materials for the preparation of the new compounds of this invention can be prepared by application of the methods described by Fried, et al., J. Am. Chem. Soc., 79, 1130 and by Arth, et al., J. Am. Chem. Soc., 80, 3160. Also, when it is desired to obtain 6-fluoro-16$\alpha$-methyl corticosteroids bearing hydrogen in the 9-position, compound XI is dehalogenated by treatment with zinc in acetic acid.

In carrying out the process of the present invention, the 16$\alpha$-methyl corticosteroid (I) is dissolved in a suitable solvent and hydrolyzed under mild acid or alkaline conditions. The reaction time is generally from a few hours to up to 3 days depending upon the particular compounds. In the preferred embodiment of this invention the 21-acylate is dissolved in chloroform and methanol and treated with hydrochloric acid of 20% to 37% concentration at room temperature. After several hours, the resulting 21-alcohol is isolated from the hydrolyzed mixture by evaporation under reduced pressure with simultaneous addition of water and, if desirable, purified by crystallization from a suitable organic solvent. The 21-alcohol is then converted to the bismethylenedioxy derivative (BMD) of the side-chain by combination with formaldehyde-hydrogen chloride or formaldehyde-hydrogen bromide at room temperature.

The reaction time is generally from 4 to 72 hours depending upon the compound being treated. Polymers of formaldehyde can also be used in place of aqueous formaldehyde but the formaldehyde-hydrogen chloride is the preferred reagent. In the preferred embodiment of this invention, the 21-alcohol is dissolved in methylene chloride and treated with equal volumes of 37% aqueous formaldehyde and of 37% hydrochloric acid and the two phase system stirred rapidly at room temperature for several hours. The methylene chloride which may be distilled off during this period is replaced by about 4 to 6 volumes of hexane. The bismethylenedioxy derivative is then isolated by separating the two liquid phases, extracting the aqueous layer with a suitable organic solvent, such as, hexane, and washing the combined organic solutions repeatedly with water. The organic solution is dried over anhydrous magnesium sulfate or other suitable drying agent, filtered and evaporated under reduced pressure to give the bismethylenedioxy derivative of the 16$\alpha$-methyl corticosteroid (11).

The 16$\alpha$-methyl-bismethylenedioxy derivative thus obtained is converted to the 3-alkylene ketal by reaction with a 1,2 or 1,3-glycol, such as, ethylene glycol 1,2-propanediol and 1,3-propanediol. In the preferred embodiment of this invention, the 16$\alpha$-methyl-bismethylenedioxy derivative is mixed with ethylene glycol, benzene and paratoluenesulfonic acid monohydrate and the mixture refluxed and stirred for several hours with continuous removal of water. Upon completion of the reaction, the solution is cooled and made basic by addition of 5% aqueous sodium carbonate. The aqueous solution is extracted with a 1:1 benzene-ether solution, the organic layers separated, dried over a suitable drying agent, filtered and evaporated to give the corresponding 3-ketalized-$\Delta^5$-pregnene compound (III). The 3-ketalized-11 keto - 16$\alpha$-methyl-$\Delta^5$-pregnene-bismethylenedioxy derivative is reduced with a chemical carbonyl reducing agent, such as, sodium borohydride or lithium aluminum hydride, in an organic solvent to produce the corresponding 3-ketalized-11$\beta$-hydroxyl-16$\alpha$-methyl-$\Delta^5$-pregnene-bismethylenedioxy compound. In the preferred embodiment of this invention, the 3-ketalized-11-keto derivative is dissolved in ether and treated with an ethereal solution of sodium borohydride at reflux. Upon completion of this reaction, the reaction mixture is cautiously treated with water or a dilute mineral acid to decompose excess sodium borohydride and organo-metal complexes. The product is isolated by filtration followed by evaporation of the solvent.

In carrying out the epoxidation step, the bismethylenedioxy derivative of the 3-ketalized-11$\beta$-hydroxyl-$\Delta^5$-pregnene compound is treated with a peracid such as, peracetic or perbenzoic acid or other known epoxidizing agent to product the 5$\alpha$,6$\alpha$-epoxide. A mixture of both the $\alpha$- and $\beta$-oxides is produced in this epoxidation step and can be separated by chromatographic or crystallization techniques well known in the art. In the preferred embodiment of this invention, the bismethylenedioxy derivative of the 3-ketalized-11β-hydroxyl-Δ$^5$-pregnene compound is dissolved in chloroform and treated with perbenzoic acid at a temperature of about 0° C. to 5° C. for several hours followed by several hours at room temperature. The reaction mixture is then washed successively with 5% aqueous sodium bicarbonate and water. The chloroform layer is separated, dried over magnesium sulfate, filtered and evaporated to give the crude oxide mixture. Crystallization from methanol gives the desired 5α,6α-epoxide (V). The thus obtained 5α,6α-oxido-16α-methyl compound is then dehydrated at the 9,11-positions with a suitable dehydrating agent, such as, methanesulfonyl chloride or paratoluene sulfonyl chloride. In the preferred embodiment of the invention, a pyridine solution of the said 5α,6α-oxide under anhydrous conditions is treated with a pyridine solution of methanesulfonyl chloride at about 0° C. to −20° C. After one to four hours, the reaction mixture is allowed to come to room temperature. After several hours at room temperature the solution is added dropwise to cold water and the product, the 5α,6α-oxido-Δ$^{9(11)}$-pregnene compound separated by filtration. It is recrystallized from a suitable organic solvent for purification.

The 5α,6α-oxido-Δ$^{9(11)}$-pregnene compound upon treatment with hydrogen fluoride or other fluorinating agents yields the corresponding 5α-hydroxyl-6β-fluoro compound (VII). The epoxide opening step can be performed under anhydrous or aqueous conditions in the presence or absence of a catalyst, such as, boron trifluoride. When anhydrous conditions are employed, a temperature of about 0° C. to −20° C. is generally employed. The use of anhydrous conditions does not remove the 3-ketal or bismethylenedioxy functions whereas, aqueous conditions result in elimination of the 3-ketal function. The use of aqueous hydrofluoric acid also permits simultaneous removal of the bismethylenedioxy function to produce the 5α-hydroxyl-6β-fluoro-corticosteroid (VIII). The bismethylenedioxy derivative of the 6β-fluoro-16α-methyl-Δ$^{9(11)}$-pregnene-5α,17α,21-triol-3,20-dione 3-ethylene ketal obtained under anhydrous conditions is then hydrolyzed by means of aqueous acid, such as, sulphuric acid, formic acid or acetic acid. In the preferred embodiment of the invention, it is preferred to reflux the bismethylenedioxy-3-ketalized derivative for a brief period, generally about 10 to 30 minutes, in 60% formic acid. The crude 6β-fluoro-16α-methyl-5α,17α dihydroxy corticosteroid crystallizes upon the addition of water and concentration of the reaction mixture and is purified by recrystallization from a suitable organic solvent, such as, isopropyl ether.

In the preparation of the Δ$^{4,9(11)}$-pregnadiene compound (IX), the 5α-hydroxy-6β-fluoro compound is dehydrated at the 4,5-positions in acid media. Suitable acid dehydrating agents include mineral acids, such as, hydrochloric acid and sulphuric acid. In addition, acetic acid, acetic anhydride and paratoluene sulfonic acid serve as suitable dehydrating agents. In the preferred embodiment of this invention, acid dehydration is employed, preferably in the presence of acetic or hydrochloric acid.

The 6-fluoro-Δ$^{4,9(11)}$-pregnadiene compound thus obtained consists essentially of the 6β-fluoro-epimer. The 6α-epimer can be separated by chromatographic or crystallization techniques well known in the art. Conversion of the 6β-epimer or of mixtures consisting essentially of the 6β-epimer is accomplished by treatment of the 6-fluoro compound with a prototropic agent, such as, water, alcohols, organic acids and mineral acids. In the preferred embodiment of this invention the 6-fluoro compound, dissolved in chloroform and absolute methanol, is treated with anhydrous hydrogen chloride at −5° C. to −10° C. for about 3 hours. At the end of this period the reaction mixture is diluted with chloroform, washed successively with sodium bicarbonate and water and evaporated to dryness under reduced pressure. The 6α-fluoro compound (X) is then recovered from the crude reaction product and purified by recrystallization.

It should be understood that the remaining reaction sequence applies equally well to the 6α- or the 6β-fluoro compounds. The particular 6-fluoro substituent used depends only on the final product desired. When, of course, the 6β-fluoro epimer of the final product is desired, the isomerization step is omitted.

In carrying out the process of the present invention to produce 9α-halo-11β-hydroxy derivatives (XI) the Δ$^{4,9(11)}$-steroid is dissolved in an inert organic solvent, such as, dioxane, and reacted with a hypohalous acid such as, hypobromous or hypochlorous acid, or with a hypohalous acid releasing agent in the presence of an acid. Such hypohalous releasing agents include N-bromo-acetamide, N-chloroacetamide, N-bromo-succinimide, N-iodosuccinimide, and N-chlorosuccinimide. Such agents permit the formation of a hypohalous acid in situ when treated with aqueous sulfuric acid, perchloric acid, and the like. The reaction is generally conducted at about room temperature using from equimolar up to 25% excess of hypohalous acid releasing agent. At the completion of reaction, generally not over 2 hours, the excess of hypohalous acid is destroyed by the addition of sodium sulfite or hyposulfite. The 9α-halo-11β-hydroxy derivative thus produced is isolated by the addition of water followed by filtration of the precipitated product or extraction with an organic solvent. Purification is accomplished by recrystallization from a suitable organic solvent such as acetone. In the preferred embodiment of this invention the Δ$^{4,9(11)}$-pregnadiene derivative is dissolved in dioxane and perchloric acid solution at room temperature, and treated with solid N-bromoacetamide. The reaction mixture is protected from light and, after 1 hour, the excess perchloric acid is destroyed by the addition of aqueous sodium sulfite. The 9α-bromo-11β-hydroxy halohydrin is isolated as described above and purified by recrystallization from acetone. The said halohydrin is then converted to the 9β,11β-oxide derivative by treatment with sodium or potassium acetate at room temperature for several hours. The epoxide is recovered by the addition of water followed by evaporation of the alcohol under reduced pressure and extraction of the aqueous solution with chloroform. The product is purified by recrystallization from a suitable organic solvent such as acetone.

Conversion of the 9β,11β-oxide to a halohydrin different from the foregoing halohydrin is accomplished by treatment with a halogenating agent such as, hydrogen halide, in a suitable organic solvent. The halogenating agent used may be the gaseous hydrogen halide, a concentrated aqueous solution, or a metal halide which releases hydrogen halide when treated with acids. The anhydrous hydrogen halides are generally preferred since they permit the use of temperatures ranging from 0° C. to 50° C. and relatively short reaction times. The product is recovered by neutralizing the excess hydrogen halide followed by extraction with water immiscible solvents, such as, methylene chloride and ethylene chloride. Evaporation of the organic solvent leaves the crude halohydrin which is purified by recrystallization from a suitable organic solvent. In the preferred embodiment of this invention the 9β,11β-oxide is treated with hydrogen fluoride as described above. Hydrolysis under acid conditions of the 6,9α - difluoro - 16α - methyl-Δ$^4$-pregnene-11β,17α,21-triol-3,20-dione-21-acetate (XIII) gives the desired 6,9α-difluoro - 16α - methyl - Δ$^4$ - pregnene - 11β,17α,21 - triol-3,20-dione.

In the oxidation of the 11β-hydroxyl corticosteroid to the corresponding 11-keto compound, the 11β-hydroxyl compound is dissolved in a suitable organic solvent and treated with an oxidizing agent, such as, chromic acid, for a relatively brief period generally about, 15 to 60 minutes. In the preferred embodiment of this invention, an acetic acid solution of chromic acid is added to a solution of the 21-acetate of the 11β-hydroxy compound in glacial acetic acid. After about a half-hour alcohol is added and the mixture concentrated to a syrup under reduced pressure. The desired 11-keto compound is isolated with chloroform and recrystallized from aqueous alcohol. Acid hydrolysis of the 21-acetate of the 11-keto compound produces the 21-alcohol.

The 6-fluoro-11-oxygenated-16α-methyl corticosteroids of this invention corresponding to Formula I, wherein X is hydrogen and B is selected from the group consisting of carbonyl and β-hydroxymethylene, are produced by the fluorination of the 5α,6α-oxido-16α-methyl compound (V) as outlined above to give 17,20;20,21-bismethylenedioxy - 3 - keto - 5α,11β - dihydroxy - 6β - fluoro - 16α-methylallopregnane 3-ethylene ketal. This valuable intermediate, or the precursor 5α,6α-oxido compound (V), can be oxidized to the corresponding 11-keto compound, if desired. In the preferred embodiment of this invention to produce 6-fluoro-11-oxygenated-16α-methyl corticosteroids, utilization of the 17,20;20,21-bismethylenedioxy-3 - keto - 5α,11β - dihydroxy - 6β - fluoro - 16α - methyl allopregnane 3-ethylene ketal is favored.

The 5α,11β - dihydroxy - 6β - fluoro-bismethylenedioxy compound is then hydrolyzed with 60% formic acid as as described above to remove the bismethylenedioxy and ketal functions to give 3,20-diketo-5α,11β,17α,21-tetrahydroxy-6β-fluoro-16α-methyl-allopregnane.

Acetylation of the thus produced allopregnane to the 21-acetate followed by dehydration at the 4,5-positions as previously described produces 6β-fluoro-16α-methyl-Δ⁴ - pregnene - 11β,17α,21 - triol - 3,20-dione 21-acetate. Isomerization of the 6β-fluoro compound, preferably with anhydrous hydrogen chloride as described above yields 6α-fluoro-16α-methyl-Δ⁴-pregnene-11β,17α,21-triol-3,20-dione 21-acetate. Oxidation of the thus produced 6α-fluoro compound produces 6α-fluoro-16α-methyl-Δ⁴-pregnene-17α,21-diol-3,11,20-trione 21-acetate.

Dehydrogenation of the 11β-hydroxy compounds or of the 11-keto compounds of this invention in the form of their 21-acetates to the Δ¹,⁴-analogs is accomplished with excess selenium dioxide in a high boiling inert organic solvent such as, phenetole, diethylene glycol diether, dibutyl cellosolve, xylene, dioxane, and so forth. A tertiary organic base may be added to expedite reaction. In the preferred embodiment of this invention the steroid compound, dibutylcellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the product isolated by crystallization from a suitable organic solvent or by chromatography on various adsorbents.

The order of the various steps outlined above can be varied considerably as will be recognized by those skilled in the art. For example, when 9α-fluoro-16α-methyl-Δ⁴-pregnene-17α,21-diol-3,11,20-trione 21-acetate is utilized as starting material, the reaction sequence can proceed from compound V to VIII with elimination of step (6) and thence by acetylation and isomerization to the compound analogous to XIII. Choice of starting material thus determines the reaction sequence to be followed.

The following examples are given to illustrate the process and products of the present invention and are not to be construed as limiting.

EXAMPLE I

*16α-methyl-Δ⁴-pregnene-17α,21-diol-3,11,20-trione*

To a suspension of 16α-methyl-Δ⁴-pregnene-17α,21-diol-3,11,20-trione-21 acetate (450 g.) in chloroform (4.6 l.), methanol (15.2 l.) and water (1.8 l.) is added 1.8 l. of concentrated hydrochloric acid. After 18 hours at room temperature the reaction mixture is concentrated under reduced pressure at 30° C. to 35° C. with simultaneous addition of water. The product, 16α-methyl-Δ⁴-pregnene-17α,21-diol-3,11,20-trione, is removed by filtration and used directly in the procedure of Example II. If desired, the product may be recrystallized from 95% alcohol.

EXAMPLE II

*17,20;20,21-bismethylenedioxy-16α-methyl-Δ⁴-pregnene-3,11-dione*

The bismethylenedioxy derivative is prepared by dissolving 16α-methyl-Δ⁴-pregnene-17α,21-diol-3,11,20-trione (225 g.) in methylene chloride (1.5 l.) and treating with 37% aqueous formaldehyde (2.25 l.) and concentrated hydrochloric acid (2.25 l.) The two phase system is stirred rapidly at room temperature for 36 hours. During this period most of the methylene chloride distills off and is replaced with hexane (12.5 l.). The two layers are separated, the aqueous acid layer extracted with one-half its volume of hexane and the combined hexane solutions washed with four separate portions of water in the proportions of ¼ volume water per volume of hexane solution. The hexane solution is dried over anhydrous magnesium sulfate, filtered and evaporated under reduced pressure to give the crude bismethylenedioxy derivative of 16α-methyl-Δ⁴-pregnene-17α,21-diol-3,11,20-trione. Recrystallization from methylene-chloride-methanol yields the pure product.

In the same manner, the following bismethylenedioxy (BMD) derivatives are prepared from the appropriate starting materials:

BMD - 16α-methyl-Δ⁴-pregnene-11β,17α,21-triol-3,20-dione

BMD - 9α-fluoro-16α-methyl-Δ⁴-pregnene-11β,17α,21-triol-3,20-dione

BMD - 9α - chloro-16α-methyl-Δ⁴-pregnene-11β,17α,21-triol-3,20-dione

BMD - 9α - fluoro-16α-methyl-Δ⁴-pregnene-17α,21-diol-3,11,20-trione

BMD - 9α-methoxy-16α-methyl-Δ⁴-pregnene-17α,21-diol-3,11,20-trione

BMD - 9α - ethoxy-16α-methyl-Δ⁴-pregnene-11β,17α,21-triol-3,20-dione

BMD - 9α - bromo-16α-methyl-Δ⁴-pregnene-17α,21-diol-3,11,20-trione

BMD - 9α - chloro-16α-methyl-Δ⁴-pregnene-17α,21-diol-3,11,20-trione

BMD - 9α - ethoxy-16α-methyl-Δ⁴-pregnene-17α,21-diol-3,11,20-trione

BMD - 9α - methoxy-16α-methyl-Δ⁴-pregnene-11β,17α,21-triol-3,20-dione

BMD - 9α - bromo-16α-methyl-Δ⁴-pregnene-11β,17α,21-triol-3,20-dione

EXAMPLE III

*17,20;20,21-bismethylenedioxy-16α-methyl-Δ⁵-pregnene-3,11-dione 3-ethylene ketal*

BMD - 16α-methyl-Δ⁴-pregnene-17α,21-diol-3,11,20-trione (150 g.), benzene (2.25 l.) and ethylene glycol (50 ml.) are thoroughly mixed and heated to remove a small amount of water by azeotropic distillation. Paratoluene sulfonic acid monohydrate (5.0 gr.) is added and the mixture stirred and refluxed for 20 hours with continuous removal of water. The mixture is then cooled, made basic by the addition of 5% aqueous sodium carbonate, and extracted with a 1:1 solution of benzene and ether. The organic layer is separated, dried over anhydrous magnesium sulfate, filtered and evaporated under reduced pressure to give 16α-methyl-Δ⁵-pregnene-17α,21-diol-3,11,20-trione 3-ethylene ketalbismethylenedioxy derivative.

Similarly, the following 3-ethylene ketals are prepared:

BMD - 16α-methyl-Δ⁵-pregnene-11β,17α,21-triol-3,20-dione 3-ethylene ketal

BMD - 9α - fluoro-16α-methyl-Δ⁵-pregnene-11β,17α,21-triol-3,20-dione 3-ethylene ketal BMD - 9α - chloro-16α-methyl-Δ⁵-pregnene-11β,17α,21-triol-3,20-dione 3-ethylene ketal
BMD - 9α - fluoro-16α-methyl-Δ⁵-pregnene-17α,21-diol-3,11,20-trione 3-ethylene ketal
BMD - 9α - methoxy-16α-methyl-Δ⁵-pregnene-17α,21-diol-3,11,20-trione 3-ethylene ketal
BMD - 9α - ethoxy-16α-methyl-Δ⁵-pregnene-11β,17α,21-triol-3,20-dione 3-ethylene ketal
BMD - 9α - bromo-16α-methyl-Δ⁵-pregnene-17α,21-diol-3,11,20-trione 3-ethylene ketal
BMD - 9α - chloro-16α-methyl-Δ⁵-pregnene-17α,21-diol-3,11,20-trione 3-ethylene ketal
BMD - 9α - ethoxy-16α-methyl-Δ⁵-pregnene-17α,21-diol-3,11,20-trione 3-ethylene ketal
BMD - 9α - methoxy-16α-methyl-Δ⁵-pregnene-11β,17α,21-triol-3,20-dione 3-ethylene ketal
BMD - 9α - bromo-16α-methyl-Δ⁵-pregnene-11β,17α,21-triol-3,20-dione 3-ethylene ketal

EXAMPLE IV

*17,20;20,21-bismethylenedioxy-16α-methyl-Δ⁵-pregnene-11β-ol-3-one-3-ethylene ketal*

To a solution of 16α-methyl-Δ⁵-pregnene-17α,21-diol-3,11,20-trione 3-ethylene ketal-bismethylenedioxy derivative (50 gms.) in anhydrous ether (22 l.) is gradually added a solution of sodium borohydride (100 gms.), ether (20 l.) over a period of about 2 hours. Water (2 l.) was then slowly added and the ether phase separated. The aqueous phase is extracted with ethylacetate and the extract added to the ether phase. The combined ether-ethylacetate solution is washed with water, dried and evaporated to dryness under reduced pressure to give the BMD derivative of 16α-methyl-Δ⁵-pregnene-11β,17α,21-triol-3,20-dione 3-ethylene ketal.

Similarly, the following 11β-hydroxy derivatives are prepared:

BMD - 9α - fluoro-16α-methyl-Δ⁵-pregnene-11β,17α,21-triol-3,20-dione 3-ethylene ketal
BMD - 9α - methoxy-16α-methyl-Δ⁵-pregnene-11β,17α,21-triol-3,20-dione 3-ethylene ketal
BMD - 9α - ethoxy-16α-methyl-Δ⁵-pregnene-11β,17α,21-triol-3,20-dione 3-ethylene ketal
BMD - 9α - bromo-16α-methyl-Δ⁵-pregnene-11β,17α,21-triol-3,20-dione 3-ethylene ketal
BMD - 9α - chloro-16α-methyl-Δ⁵-pregnene-11β,17α,21-triol-3,20-dione 3-ethylene ketal

EXAMPLE V

*17,20;20,21-bismethylenedioxy-3-keto-5α,6α-oxido-11β-hydroxy-16α-methylallopregnane 3-ethylene ketal*

To a solution of the bismethylenedioxy derivative of 16α - methyl-Δ⁵-pregnene-11β,17α,21-triol-3,20-dione 3-ethylene ketal (75 g.) in chloroform (1.5 l.) is added a chilled solution of perbenzoic acid (28.5 g.) dissolved in chloroform (475 ml.). After 24 hours at about 5° C. followed by 72 hours at room temperature, the solution is washed with 5% aqueous sodium bicarbonate and then with water. The chloroform layer is separated, dried and evaporated to give the crude epoxide. Recrystallization from methanol gives pure 5α,6α-oxido-16α-methyl-11β,17α,21 - trihydroxy-allopregnane-3,20-dione 3-ethylene ketal bismethylenedioxy derivative.

In like manner, the following 5α,6α-epoxides are prepared from the appropriate Δ⁵-pregnene derivative:

BMD - 5α,6α - oxido-9α-fluoro-16α-methyl-11β,17α,21-trihydroxy-allopregnane-3,20-dione 3-ethylene ketal
BMD - 5α,6α - oxido-9α-chloro-16α-methyl-11β,17α,21-trihydroxy-allopregnane-3,20-dione 3-ethylene ketal
BMD - 5α,6α-oxido-9α-methoxy-16α-methyl-11β,17α,21-trihydroxy-allopregnane-3,20-dione 3-ethylene ketal
BMD - 5α,6α - oxido-9α-ethoxy-16α-methyl-11β,17α,21-trihydroxy-allopregnane-3,20-dione 3-ethylene ketal
BMD - 5α,6α - oxido-9α-bromo-16α-methyl-11β,17α,21-trihydroxy-allopregnane-3,20-dione 3-ethylene ketal
BMD - 5α,6α - oxido-16α-methyl-17α,21-dihydroxy-allopregnane-3,11,20-trione 3-ethylene ketal
BMD - 5α,6α - oxido - 9α-fluoro-16α-methyl-17α,21-dihydroxy-allopregnane-3,11,20-trione 3-ethylene ketal
BMD - 5α,6α - oxido-9α-chloro-16α-methyl-17α,21-dihydroxy-allopregnane-3,11,20-trione 3-ethylene ketal
BMD - 5α,6α - oxido-9α-bromo-16α-methyl-17α,21-dihydroxy-allopregnane-3,11,20-trione 3-ethylene ketal
BMD - 5α,6α - oxido-9α-methoxy-16α-methyl-17α,21-dihydroxy-allopregnane-3,11,20-trione 3-ethylene ketal
BMD - 5α,6α - oxido-9α-ethoxyl-16α-methyl-17α,21-dihydroxy-allopregnane-3,11,20-trione 3-ethylene ketal

EXAMPLE VI

*17,20;20,21-bismethylenedioxy-5α,6α-oxido-16α-methyl-Δ⁹⁽¹¹⁾-pregnene-3-one-3-ethylene ketal*

To a solution of the bismethylenedioxy derivative of 5α,6α - oxido-16α-methyl-11β,17α,21-trihydroxy-allopregnane-3,20-dione 3-ethylene ketal (55 g.) in anhydrous pyridine (600 ml.) cooled to 0° C., and protected from atmospheric moisture, is added a solution of methane sulfonyl chloride (51.5 ml.) in chloroform (80 ml.). After about one hour at 0° C., the mixture is allowed to come to room temperature and left standing for ten hours. The solution is then added dropwise to 5.5 l. of ice water with stirring to precipitate the bismethylenedioxy derivative of 5α,6α - oxido-16α-methyl-Δ⁹⁽¹¹⁾-pregnene-17α,21-diol-3,20-dione 3-ethylene ketal. The product is recovered by filtration, dried and recrystallized from ethyl acetate.

EXAMPLE VII

*17,20;20,21-bismethylenedioxy-6β-fluoro-16α-methyl-Δ⁹⁽¹¹⁾-pregnene-5α-ol-3-one 3-ethylene ketal*

Into each of four polyethylene bottles containing a solution of the bismethylenedioxy derivative of 5α,6α-oxido-16α-methyl-Δ⁹⁽¹¹⁾-pregnene-17α,21-diol-3,20 - dione 3-ethylene ketal (9.2 g.) at 0° C. to 5° C. in methylene chloride (150 ml.) is passed anhydrous hydrogen fluoride (20 g.). After vigorous stirring for two hours, the combined reaction mixtures are evaporated to dryness to give the crude bismethylenedioxy derivative of 6β-fluoro-16α-methyl-Δ⁹⁽¹¹⁾-pregnene-5α,17α,21-triol-3,20 - dione 3-ethylene ketal.

The following fluorohydrins are prepared in the same manner:

BMD-6β-fluoro-16α-methyl-5α,11β,17α,21-tetrahydroxy-allopregnane-3,20-dione 3-ethylene ketal
BMD-6β-fluoro-16α-methyl-5α,17α,21-trihydroxy-allopregnane-3,11,20-trione 3-ethylene ketal
BMD-6β,9α-difluoro-16α-methyl-5α,17α,21-trihydroxy-allopregnane-3,11,20-trione 3-ethylene ketal
BMD-6β-fluoro-9α-chloro-16α-methyl-5α,17α,21-trihydroxy-allopregnane-3,11,20-trione 3-ethylene ketal
BMD-6β-fluoro-9α-bromo-16α-methyl-5α,17α,21-trihydroxy-allopregnane-3,11,20-trione 3-ethyene ketal
BMD-6β-fluoro-9α-methoxy-16α-methyl-5α,17α,21-trihydroxy-allopregnane-3,11,20-trione 3-ethylene ketal
BMD-6β,9α-difluoro-16α-methyl-5α,11β,17α,21-tetrahydroxy-allopregnane-3,11,20-trione 3-ethylene ketal
BMD-6β,9α-difluoro-16α-methyl-5α,11β,17α,21-tetrahydroxy-allopregnane-3,20-dione 3-ethylene ketal
BMD-6β-fluoro-9α-chloro-16α-methyl-5α,11β,17α,21-tetrahydroxy-allopregnane-3,20-dione 3-ethylene ketal
BMD-6β-fluoro-9α-methoxy-16α-methyl-5α,11β,17α,21-tetrahydroxy-allopregnane-3,20-dione 3-ethylene ketal
BMD-6β-fluoro-9α-ethoxy-16α-methyl-5α,11β,17α,21-tetrahydroxy-allopregnane-3,20-dione 3-ethylene ketal
BMD-6β-fluoro-9α-bromo-16α-methyl-5α,11β,17α,21-tetrahydroxy-allopregnane-3,20-dione 3-ethylene ketal

EXAMPLE VIII-A

*6β-fluoro-16α-methyl-Δ$^{9(11)}$-pregnene-5α,17α,21-triol-3,20-dione*

To a solution of the bismethylenedioxy derivative of 5α,6α-oxido-16α-methyl-Δ$^{9(11)}$-pregnene-17α,21-diol-3,20-dione 3-ethylene ketal (5.2 g.) in methylene chloride (75 ml.) contained in a polyethylene beaker is added 25 ml. of 48% aqueous hydrofluoric acid. After vigorous stirring, at room temperature for one hour, the reaction mixture is poured into 750 ml. of water. To effect complete removal of the ketal and bismethylenedioxy functions the aqueous organic system is heated to remove the methylene chloride. The remaining aqueous acid solution is heated to boiling for one-half hour and then concentrated under reduced pressure. The crude 6β-fluoro-16α-methyl-Δ$^{9(11)}$-pregnene-5α,17α,21-triol-3,20-dione which separates is recrystallized from isopropyl ether.

EXAMPLE VIII-B

Alternatively, the product of Example VII, the bismethylenedioxy derivative of 6β-fluoro-16α-methyl-Δ$^{9(11)}$-pregnene-5α,17α,21-triol-3,20-dione 3-ethylene ketal (25 g.) is refluxed for approximately 30 minutes in 60% formic acid (1.25 l.). Water (750 ml.) is then added and the solution concentrated at room temperature under reduced pressure. The 6β-fluoro-16α-methyl-Δ$^{9(11)}$-pregnene-5α,17α,21-triol-3,20-dione which separates is purified by recrystallization from isopropyl ether. The product is identical to that of Example VIII-A.

Hydrolysis of the products of Example VII produces the following compounds.

6β,9α-difluoro-16α-methyl-5α,11β,17α,21-tetrahydroxy-allopregnane-3,20-dione

6β-fluoro-9α-chloro-16α-methyl-5α,11β,17α,21-tetrahydroxy-allopregnane-3,20-dione 6β-fluoro-9α-bromo-16α-methyl-5α,11β,17α,21-tetrahydroxy-allopregnane-3,20-dione 6β-fluoro-9α-methoxy-16α-methyl-5α,11β,17α,21-tetrahydroxy-allopregnane-3,20-dione 6β-fluoro-9α-ethoxy-16α-methyl-5α,11β,17α,21-tetrahydroxy-allopregnane-3,20-dione 6β-fluoro-16α-methyl-5α,11β,17α,21-tetrahydroxy-allopregnane-3,20-dione 6β-fluoro-16α-methyl-5α,17α,21-trihydroxy-allopregnane-3,11,20-trione 6β,9α-difluoro-16α-methyl-5α,17α,21-trihydroxy-allopregnane-3,11,20-trione 6β-fluoro-9α-chloro-16α-methyl-5α,17α,21-trihydroxy-allopregnane-3,11,20-trione 6β-fluoro-9α-bromo-16α-methyl-5α,17α,21-trihydroxy-allopregnane-3,11,20-trione 6β-fluoro-9α-methoxy-16α-methyl-5α,17α,21-trihydroxy-allopregnane-3,11,20-trione 6β-fluoro-9α-ethoxy-16α-methyl-5α,17α,21-trihydroxy-allopregnane-3,11,20-trione

EXAMPLE IX

*6β-fluoro-16α-methyl-Δ$^{4,9(11)}$-pregnadiene-17α,21-diol-3,20-dione-21-acetate*

The 6β-fluoro-16α-methyl-Δ$^{9(11)}$-pregnene-5α,17α,21-triol-3,20-dione (15 g.) is acetylated to the 21-acetate with acetic anhydride in anhydrous pyridine according to standard procedures. The dry 21-acetate (10 g.) is dissolved in acetic acid (500 ml.) and water (1.0 ml.), refluxed for one hour, then cooled, diluted with 500 ml. of water and evaporated to dryness under reduced pressure. The residue of 6β-fluoro-16α-methyl-Δ$^{4,9(11)}$-pregnadiene-17α,21-diol-3,20-dione-21 acetate is used directly in the following example.

In like manner, the following 6β-fluoro-16α-methyl-Δ$^4$-pregnene compounds are prepared from the products of Example VIII-B:

6β-fluoro-16α-methyl-Δ$^4$-pregnene-11β,17α,21-triol-3,20-dione 21-acetate

6β-fluoro-9α-ethoxy-16α-methyl-Δ$^4$-pregnene-11β,17α,21-triol-3,20-dione 21-acetate 6β-fluoro-16α-methyl-Δ$^4$-pregnene-17α,21-diol-3,11,20-trione 21-acetate 6β,9α-difluoro-16α-methyl-Δ$^4$-pregnene-17α,21-diol-3,11,20-trione 21-acetate 6β-fluoro-9α-chloro-16α-methyl-Δ$^4$-pregnene-17α,21-diol-3,11,20-trione 21-acetate 6β-fluoro-9α-bromo-16α-methyl-Δ$^4$-pregnene-17α,21-diol-3,11,20-trione 21-acetate 6β-fluoro-9α-methoxy-16α-methyl-Δ$^4$-pregnene-17α,21-diol-3,11,20-trione 21-acetate 6β-fluoro-9α-ethoxy-16α-methyl-Δ$^4$-pregnene-17α,21-diol-3,11,20-trione 21-acetate 6β,9α-difluoro-16α-methyl-Δ$^4$-pregnene-11β,17α,21-triol-3,20-dione-21-acetate 6β-fluoro-9α-chloro-16α-methyl-Δ$^4$-pregnene-11β,17α,21-triol-3,20-dione 21-acetate 6β-fluoro-9α-bromo-16α-methyl-Δ$^4$-pregnene-11β,17α,21-triol-3,20-dione 21-acetate 6β-fluoro-9α-methoxy-16α-methyl-Δ$^4$-pregnene-11β,17α,21-triol-3,20-dione 21-acetate

EXAMPLE X

*6α-fluoro-16α-methyl-Δ$^{4,9(11)}$-pregnadiene-17α,21-diol-3,20-dione-21-acetate*

Into a solution of 6β-fluoro-16α-methyl-Δ$^{4,9(11)}$-pregnadiene-17α,21-diol-3,20-dione-21-acetate (10 g.) in chloroform (850 ml.) and absolute alcohol (7 ml.) at −5° C. to −10° C., a stream of anhydrous hydrochloric acid is bubbled for about 3 hours. At the end of this period, the solution is diluted with chloroform (1.5 l.), washed successively with sodium bicarbonate and water, dried and evaporated to dryness under reduced pressure at 35–45° C. The residue, 6α-fluoro-16α-methyl-Δ$^{4,9(11)}$-pregnadiene-17α,21-diol-3,20-dione 21 acetate is recrystallized from acetone-Skellysolve B.

The following 6α-fluoro epimers are prepared in the same manner.

6α,9α-difluoro-16α-methyl-Δ$^4$-pregnene-11β,17α,21-triol-3,20-dione 21-acetate

6α-fluoro-9α-chloro-16α-methyl-Δ$^4$-pregnene-11β,17α,21-triol-3,20-dione 21-acetate 6α-fluoro-9α-bromo-16α-methyl-Δ$^4$-pregnene-11β,17α,21-triol-3,20-dione 21-acetate 6α-fluoro-9α-methoxy-16α-methyl-Δ$^4$-pregnene-11β,17α,21-triol-3,20-dione 21-acetate 6α-fluoro-16α-methyl-Δ$^{9(11)}$-pregnene-5α,17α,21-triol-3,20-dione 21-acetate 6α-fluoro-9α-ethoxy-16α-methyl-Δ$^4$-pregnene-11β,17α,12-triol-3,20-dione 21-acetate 6α-fluoro-16α-methyl-Δ$^4$-pregnene-11β,17α,21-triol-3,20-dione 21-acetate 6α-fluoro-16α-methyl-Δ$^4$-pregnene-17α,21-diol-3,11,20-trione 21-acetate 6α,9α-difluoro-16α-methyl-Δ$^4$-pregnene-17α,21-diol-3,11,20-trione 21-acetate 6α-fluoro-9α-chloro-16α-methyl-Δ$^4$-pregnene-17α,21-diol-3,11,20-trione 21-acetate 6α-fluoro-9α-bromo-16α-methyl-Δ$^4$-pregnene-17α,21-diol-3,11,20-trione 21-acetate 6α-fluoro-9α-methoxy-16α-methyl-Δ$^4$-pregnene-17α,21-diol-3,11,20-trione 21-acetate 6α-fluoro-9α-ethoxy-16α-methyl-Δ$^4$-pregnene-17α,21-diol-3,11,20-trione 21-acetate Hydrolysis of the 21-acetates of Examples IX and X, according to the procedure of Example I, produces the corresponding 21-alcohols.

Although in the following procedures the compounds are listed as 6-fluoro compounds, it is understood that both the 6α- and the 6β- compounds are prepared. The appropriate 6α- or 6β- compounds prepared as described above is employed as starting material.

EXAMPLE XI

*6-fluoro-9α-bromo-16α-methyl-Δ⁴-pregnene-11β,17α,21-triol-3,20-dione*

Solid N-bromoacetamide (3.8 g.) is added with stirring to a suspension of 6-fluoro-16α-methyl-Δ$^{4,9(11)}$-pregnadiene-17α,21-diol-3,20-dione (8 g.) and 0.46 N perchloric acid (12 ml.) in peroxide-free dioxane (300 ml.) at room temperature over a period of about one hour. The reaction mixture is protected from light during the addition and for an additional hour. 10% aqueous sodium sulfite is added with stirring until KI-starch paper no longer turns blue. Ice (350 g.) and chloroform (825 ml.) is added and the layers separated. The chloroform dioxane solution is washed with water, then concentrated to a syrup in vacuo at room temperature. The addition of acetone (350 ml.) to the syrup causes rapid crystallization. The mixture is chilled overnight then filtered. Additional product is recovered from the filtrate by evaporation to dryness. Recrystallization from acetone gives pure 6 - fluoro - 9α - bromo - 16α - methyl - Δ⁴ - pregnene-11β,17α,21-triol-3,20-dione. Acetylation with acetic anhydride in pyridine gives the 21-acetate.

In like manner the following 9α-halo-11β-hydroxy halohydrin derivative is prepared:

6α-fluoro-9α-chloro-16α-methyl-Δ⁴-pregnene-11β,17α,21-triol-3,20-dione

EXAMPLE XII

*6-fluoro-9β,11β-oxido-16α-methyl-Δ⁴-pregnene-17α,21-diol-3,20-dione-21-acetate*

A solution of 6-fluoro-9α-bromo-16α-methyl-Δ⁴-pregnene-11β,17α,21-triol-3,20-dione-21-acetate (8 g.) in dioxane (260 ml.) is added to a solution of anhydrous potassium acetate (5.5 g.) in absolute alcohol (55 ml.) heated to near reflux temperature. The mixture is heated to reflux for about 45 minutes and then cooled rapidly. The product, 6 - fluoro-9β,11β-oxido-16α-methyl-Δ⁴-pregnene-17α,21-diol-3,20-dione-21-acetate, is precipitated by the addition of ice-water and filtered. Concentration of the filtrate permits isolation of additional product. The same product is obtained when the corresponding 9α-chloro or 9α-fluoro derivative is employed as starting material.

EXAMPLE XIII

*6,9α-difluoro-16α-methyl-Δ⁴-pregnene-11β,17α,21-triol-3,20-dione-21-acetate*

Approximately 6 g. of anhydrous hydrogen fluoride is passed into a solution of 6-fluoro-9β,11β-oxido-16α-methyl-Δ⁴-pregnene-17α,21-diol-3,20-dione-21-acetate (5 g.) in redistilled chloroform (100 ml.) contained in a polyethylene bottle at 0° C. The mixture becomes an intense red color and separates into two layers. After 1–5 hours at 0° C., the mixture is made weakly alkaline by the addition of sodium bicarbonate solution. The chloroform layer is separate and evaporated to dryness to give the crude 6,9α - difluoro-16α-methyl-Δ⁴-pregnene-11β,17α,21-triol-3,20-dione-21-acetate. The product is recrystallized from ethyl acetate.

By slight modifications of the above procedure the respective 9α-chloro-, and the 9α-bromo- derivatives are prepared from HCl and HBr, respectively. The 9α-bromo derivative obtained by this procedure is identical to the 6-fluoro-9α-bromo-16α-methyl-Δ⁴-pregnene-11β,17α, 21-triol-3,20-dione-21-acetates obtained in Example XI.

EXAMPLE XIV

*6,9α-difluoro-16α-methyl-Δ⁴-pregnene-17α,21-diol-3,11,20-trione*

6,9α - difluoro - 16α - methyl - Δ⁴ - pregnene - 11β,17α, 21-triol-3,20-dione-21-acetate (0.5 g.) is oxidized in glacial acetic acid (12 ml.) with chromium trioxide (0.2 g.) in 50% aqueous acetic acid at about 12° C. to 15° C. for approximately 40 minutes. The mixture is poured into water (100 ml.), neutralized with sodium bicarbonate to give crude 6,9α-difluoro-16α-methyl-Δ⁴-pregnene-17α,21-diol-3,11,20-trione-21-acetate. Hydrolysis of the 21-acetate according to the procedure of Example I gives the 6,9α - difluoro - 16α - methyl - Δ⁴ - pregnene - 17α,21 - diol-3,11,20-trione. Oxidation of 6,9α-difluoro-16α-methyl-Δ⁴-pregnene-11β,17α,21-triol-3,20-dione - 21 - acetate, the product of Example XVII, according to this procedure gives the same product.

The following 6-fluoro-9α-halo corticosteroids are prepared in the same manner from the appropriate 11β-hydroxy compound:

6-fluoro-9α-chloro-16α-methyl-Δ⁴-pregnene-17α,21-diol-3,11,20-trione 6-fluoro-9α-bromo-16α-methyl-Δ⁴-pregnene-17α,21-diol-3,11,20-trione 6-fluoro-9α-methoxy-16α-methyl-Δ⁴-pregnene-17α,21-diol-3,11,20-trione 6-fluoro-16α-methyl-Δ⁴-pregnene-17α,21-diol-3,11,20-trione 6-fluoro-9α-ethoxy-16α-methyl-Δ⁴-pregnene-17α,21-diol-3,11,20-trione 17,20;20,21-bismethylenedioxy-3,11-diketo-5α-hydroxy-6β-fluoro-16α-methylallopregnane-3-ethylene ketal 17,20;20,21-bismethylenedioxy-3,11-diketo-5α-hydroxy-6β,9α-difluoro-16α-methyl-allopregnane-3-ethylene ketal 17,20;20,21-bismethylenedioxy-3,11-diketo-5α-hydroxy-6β-fluoro-9α-chloro-16α-methyl-allopregnane-3-ethylene ketal 17,20;20,21-bismethylenedioxy-3,11-diketo-5α-hydroxy-6β-fluoro-9α-bromo-16α-methyl-allopregnane-3-ethylene ketal 17,20;20,21-bismethylenedioxy-3,11-diketo-5α-hydroxy-6β-fluoro-9α-methoxy-16α-methyl-allopregnane-3-ethylene ketal 17,20;20,21-bismethylenedioxy-3,11-diketo-5α-hydroxy-6β-fluoro-9α-ethoxy-16α-methyl-allopregnane-3-ethylene ketal

EXAMPLE XV

*6,9α-difluoro-16α-methyl-Δ$^{1,4}$-pregnadiene-17α,21-diol-3,11,20-trione*

A mixture of 0.5 g. of 6,9α-difluoro-16α-methyl-Δ⁴-pregnene-17α,21-diol-3,11,20-trione-21-acetate, freshly sublimed selenium dioxide (0.5 g.) and 10 ml. of dibutyl cellosolve is heated in a nitrogen atmosphere for about 10 hours at 175° C. The brown supernatant solution is decanted from the residual solid and cooled to room temperature. The addition of low boiling petroleum ether precipitates the impure 6,9α-difluoro-16α-methyl-Δ$^{1,4}$-pregnadiene - 17α,21-diol-3,11,20-trione-21-acetate which is purified by chromatographic separation on a Florisil column. Hydrolysis according to the method of Example I gives the corresponding 21-alcohol.

The following Δ$^{1,4}$-pregnadienes are prepared in a similar manner:

6-fluoro-9α-chloro-16α-methyl-Δ$^{1,4}$-pregnadiene-17α,21-diol-3,11,20-trione 6-fluoro-9α-bromo-16α-methyl-Δ$^{1,4}$-pregnadiene-17α,21-diol-3,11,20-trione 6-fluoro-9α-methoxy-16α-methyl-Δ$^{1,4}$-pregnadiene-17α,21-diol-3,11,20-trione 6-fluoro-9α-chloro-16α-methyl-Δ$^{1,4}$-pregnadiene-11β,17α,21-triol-3,20-dione

15

6-fluoro-9α-bromo-16α-methyl-Δ$^{1,4}$-pregnadiene-11β, 17α,21-triol-3,20-dione
6-fluoro-9α-methoxy-16α-methyl-Δ$^{1,4}$-pregnadiene-11β, 17α,21-triol-3,20-dione
6,9α-difluoro-16α-methyl-Δ$^{1,4}$pregnadiene-11β,17α,21-triol-3,20-dione
6-fluoro-9α-ethoxy-16α-methyl-Δ$^{1,4}$-pregnadiene-11β, 17α,21-triol-3,20-dione
6-fluoro-9α-ethoxy-16α-methyl-Δ$^{1,4}$-pregnadiene-17α, 21-diol-3,11,20-trione
6-fluoro-16α-methyl-Δ$^{1,4}$-pregnadiene-17α,21-diol-3,11,20-trione
6-fluoro-16α-methyl-Δ$^{1,4}$-pregnadiene-11β,17α,21-triol-3,20-dione

EXAMPLE XVI

*6-fluoro-16α-methyl-Δ$^4$-pregnene-11β,17α,21-triol-3,20-dione-21-acetate*

A solution of 6-fluoro-9α-bromo-16α-methyl-Δ$^4$-pregnene-11β,17α,21-triol-3,20-dione-21-acetate (100 mg.) in glacial acetic acid (8 ml.) is treated portionwise with zinc dust (190 mg.) on the steam bath for 15 minutes. The residual zinc is removed by filtration and the filtrate evaporated to dryness in vacuo to give 6-fluoro-16α-methyl-Δ$^4$-pregnene-11β,17α,21-triol-3,20-dione-21-acetate. Recrystallization from acetone yields the pure product.

In the same manner, utilization of the corresponding 9α-chloro compound gives the same product.

16

EXAMPLE XVII

*6-fluoro-9α-methoxy-16α-methyl-Δ$^4$-pregnene-11β, 17α,21-triol-3,20-dione*

A solution of 6-fluoro-9β,11β-oxido-16α-methyl-Δ$^4$-pregnene-17α,21-diol-3,20-dione 21-acetate (100 mg.) in methanol (8 ml.) and 72% perchloric acid (0.5 ml.) is held at room temperature for about 3 hours then neutralized with sodium bicarbonate solution and evaporated in vacuo. The product was isolated with chloroform. Reacetylation with acetic anhydride in pyridine gives the corresponding 21-acetate.

In a similar manner the following 9α-alkoxy compounds are prepared from the proper reactants:

6 - fluoro - 9α-ethoxy-16α-methyl-Δ$^4$-pregnene-11β,17α,21-triol-3,20-dione

EXAMPLE XVIII

A variety of 21-esters of the 6-fluoro-16α-methyl corticosteroids of the present invention are prepared in accordance with known procedures using the appropriate 21-alcohol and the proper acylating agent. These include such esters as the formate, the propionate, the isobutyrate, the hexanoate, the octanoate, and the succinate.

The process of this invention is outlined in the following reaction sequence:

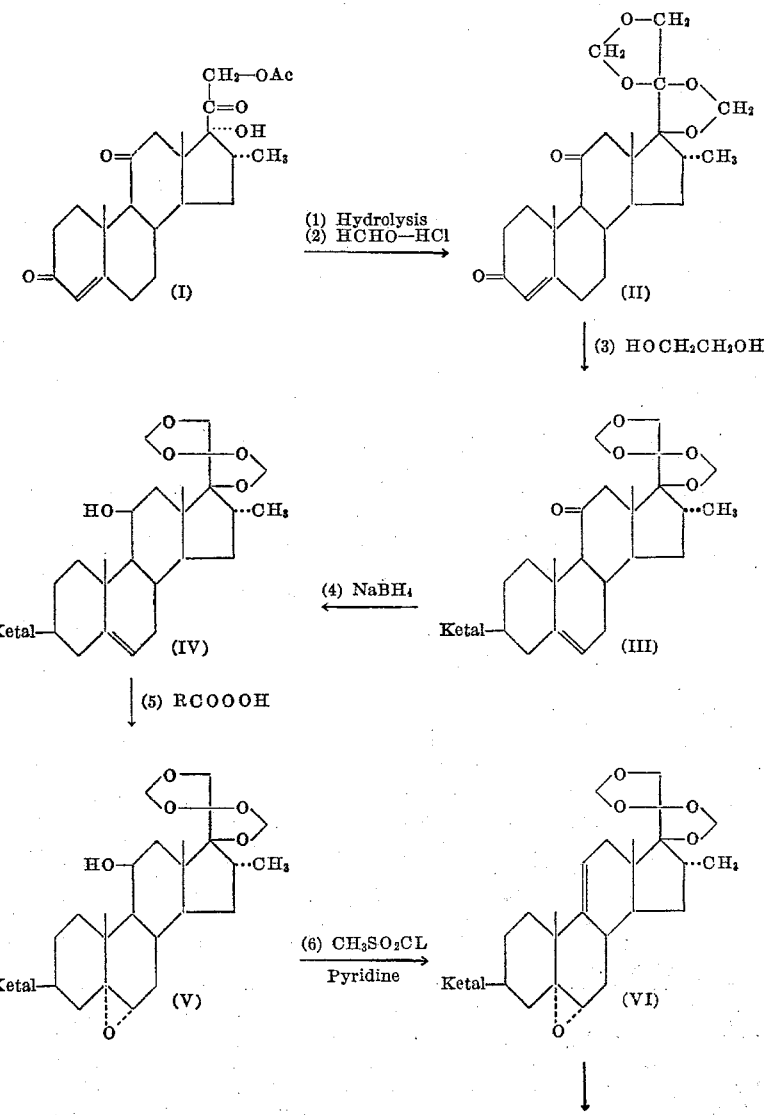

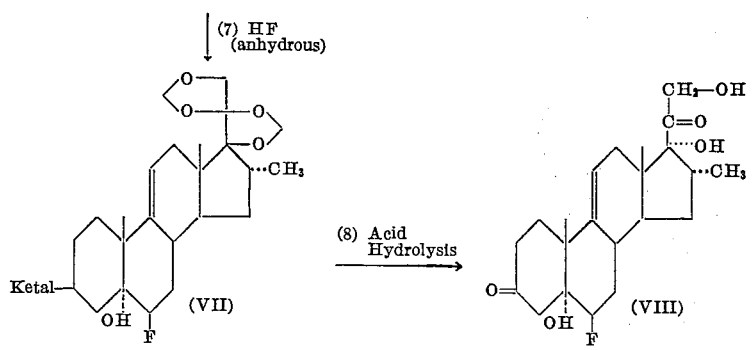
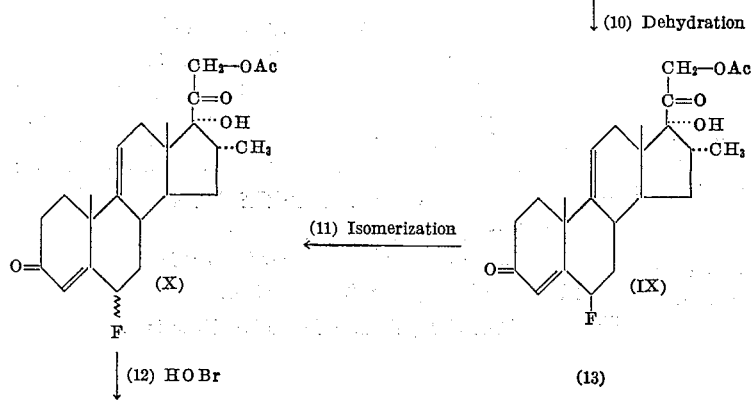
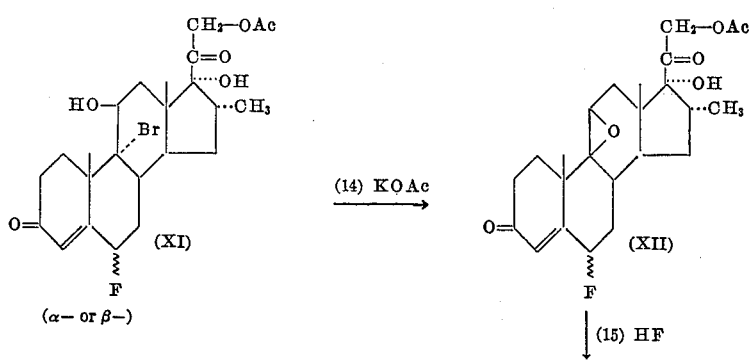
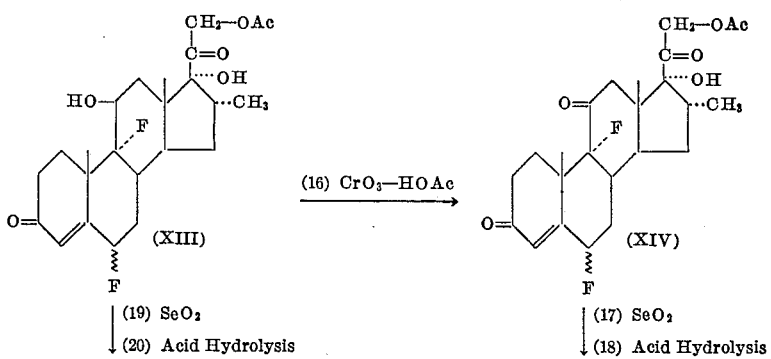
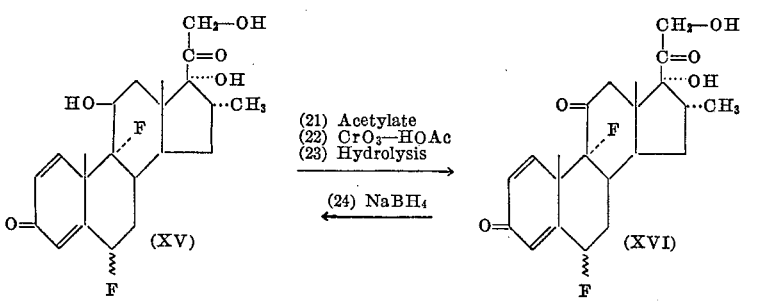

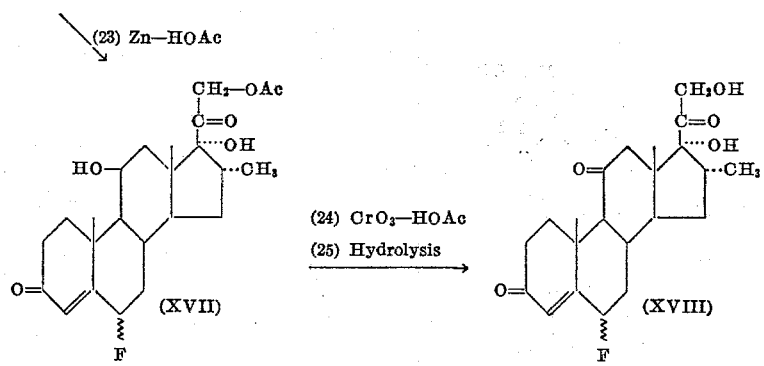

Compounds such as those exemplified in the process outlined by Formulae VIII through XIII are useful as intermediates in the preparation of other biologically active steroids by methods which will be apparent to those skilled in the art. Some of them, in fact, are biologically active per se.

What is claimed is:

A compound selected from the group consisting of 6β-fluoro - 16α - methyl-Δ$^{9(11)}$-pregnene-5α,17α,21-triol-3,20-dione and its 21-acetate.

References Cited by the Examiner

UNITED STATES PATENTS

| | | | |
|---|---|---|---|
| 2,838,497 | 6/1958 | Spero et al. | 260—239.55 |
| 2,838,498 | 6/1958 | Magerlein et al. | 260—239.55 |
| 2,838,499 | 6/1958 | Spero et al. | 260—239.55 |
| 2,841,600 | 7/1958 | Hogg et al. | 260—397.45 |

OTHER REFERENCES

Arth et al.: 80 J.A.C.S. 3160–62 (1958).
Bowers et al.: 80 J.A.C.S. 4423 (1958).

LEWIS GOTTS, *Primary Examiner.*

L. H. GASTON, E. L. ROBERTS, *Examiners.*